United States Patent
Chao

(10) Patent No.: US 8,059,920 B2
(45) Date of Patent: Nov. 15, 2011

(54) METHOD AND APPARATUS FOR PIXEL INTERPOLATION

(75) Inventor: Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1273 days.

(21) Appl. No.: 11/277,519

(22) Filed: Mar. 27, 2006

(65) Prior Publication Data

US 2006/0222267 A1  Oct. 5, 2006

(30) Foreign Application Priority Data

Apr. 1, 2005 (TW) ................ 94110451 A

(51) Int. Cl.
 *G06K 9/32* (2006.01)
 *H04N 7/01* (2006.01)
 *H04N 11/20* (2006.01)

(52) U.S. Cl. .................... 382/300; 382/298; 348/448

(58) Field of Classification Search .................. 382/293, 382/298–300; 348/448–450
See application file for complete search history.

(56) References Cited

U.S. PATENT DOCUMENTS

| | | |
|---|---|---|
| 5,134,480 A | 7/1992 | Wang |
| 6,133,957 A | 10/2000 | Campbell |
| 6,417,887 B1 | 7/2002 | Yamaji |
| 6,421,090 B1 | 7/2002 | Jiang et al. |
| 6,545,719 B1 | 4/2003 | Topper |
| 6,784,942 B2 | 8/2004 | Selby |
| 6,986,081 B1 | 1/2006 | Furutani |
| 2003/0179935 A1* | 9/2003 | Kubota ................... 382/199 |
| 2003/0179953 A1* | 9/2003 | Ishizaka .................. 382/298 |
| 2005/0073607 A1* | 4/2005 | Ji et al. .................... 348/448 |
| 2006/0039590 A1* | 2/2006 | Lachine et al. ............ 382/128 |
| 2008/0123998 A1* | 5/2008 | Gomi et al. ............... 382/300 |

FOREIGN PATENT DOCUMENTS

| | | |
|---|---|---|
| TW | 457782 | 10/2001 |
| TW | 533741 | 5/2003 |
| TW | 594659 | 6/2004 |

* cited by examiner

*Primary Examiner* — Anand Bhatnagar
*Assistant Examiner* — Nathan Bloom
(74) *Attorney, Agent, or Firm* — Winston Hsu; Scott Margo

(57) ABSTRACT

A pixel interpolation method for interpolating pixel values of a plurality of target positions of a target picture is disclosed. The pixel interpolation method includes: dynamically setting a plurality of edge detection ranges corresponding to the plurality of target positions, respectively; and for each of the plurality of target positions, performing a edge detection according to a corresponding edge detection range to determine an edge direction for the target position, and interpolating a pixel value for the target position according to pixel data corresponding to the edge direction.

24 Claims, 3 Drawing Sheets

METHOD AND APPARATUS FOR PIXEL INTERPOLATION

BACKGROUND OF THE INVENTION

1. Field of the Invention

The present invention relates to image processing techniques, and more particularly, to methods and apparatuses for pixel interpolation.

2. Description of the Prior Art

Pixel interpolation operation is a widely used image processing technique. For instance, the pixel interpolation operation is usually employed for generating required pixel values in deinterlacing or image-scaling operations. Thus, the performance of pixel interpolation operation greatly affects the interpolated image quality.

SUMMARY OF THE INVENTION

It is therefore an objective of the claimed invention to provide pixel interpolation methods and apparatuses to improve the interpolated image quality.

According to the embodiments, a pixel interpolation method for interpolating pixel values of a plurality of target positions of a target picture is disclosed. The method includes: dynamically setting a plurality of edge detection ranges corresponding to the plurality of target positions, respectively; and for each of the plurality of target positions, performing an edge detection according to a corresponding edge detection range to select an edge direction for the target position, and interpolating a pixel value for the target position according to pixel data corresponding to the selected edge direction.

A pixel interpolating device for interpolating pixel values of a plurality of target positions of a target picture is provided. The pixel interpolating device comprises a control unit for dynamically setting a plurality of edge detection ranges corresponding to the plurality of target positions, respectively; and a pixel interpolating unit coupled to the control unit for performing an edge detection according to a corresponding edge detection range to select an edge direction for each of the plurality of target positions, and for interpolating a pixel value for the target position according to pixel data corresponding to the selected edge direction.

A pixel interpolation method for interpolating a pixel value of a target position of a target picture is also disclosed. The method comprises: determining pixel values of a plurality of reference pixels corresponding to the target position; setting an edge detection range corresponding to the target position according to the determining result of the pixel values of the plurality of reference pixels; performing an edge detection according to the edge detection range to select an edge direction for the target position; and interpolating a pixel value for the target position according to pixel data corresponding to the selected edge direction.

In addition, a pixel interpolating device for interpolating a pixel value of a target position of a target picture is provided. The pixel interpolating device comprises: a detection module for determining pixel values of a plurality of reference pixels corresponding to the target position; a control unit coupled to the detection module for setting an edge detection range corresponding to the target positions according to the determining result of the pixel values of the plurality of reference pixels; and a pixel interpolating unit coupled to the control unit for performing an edge detection according to the edge detection range to select an edge direction for the target position and for interpolating a pixel value for the target position according to pixel data corresponding to the selected edge direction.

These and other objectives of the present invention will no doubt become obvious to those of ordinary skill in the art after reading the following detailed description of the preferred embodiment that is illustrated in the various figures and drawings.

DETAILED DESCRIPTION

In practice, the pixel interpolation method and related pixel interpolating apparatus to be disclosed hereinafter can be applied in various deinterlacing or image-scaling operations. In other words, the proposed pixel interpolation method can be applied to process still image and video data such as a picture, an image frame with an image field and so on.

Figure 1:
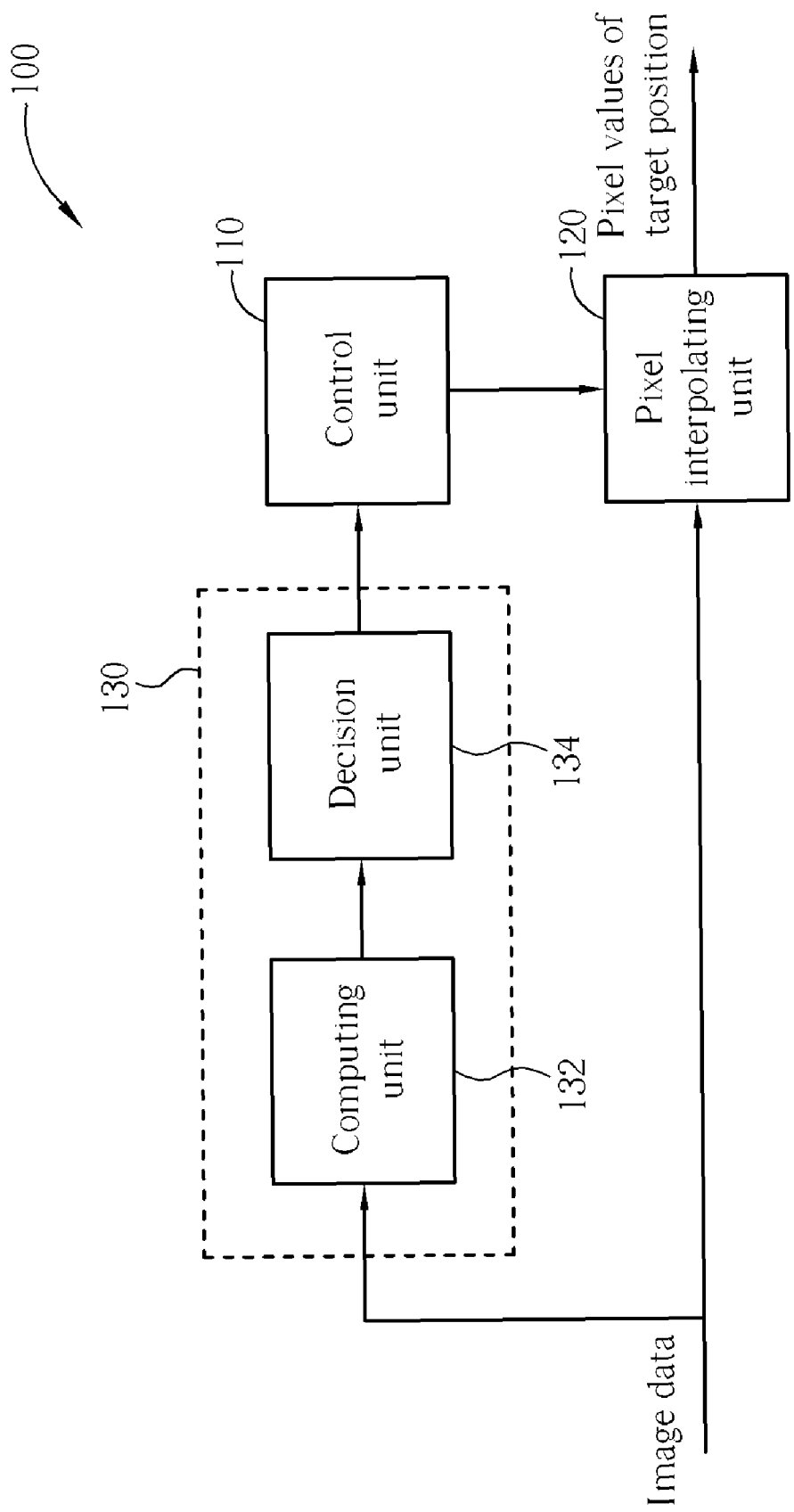
FIG. 1 is a block diagram of a pixel interpolating device according to an exemplary embodiment of the present invention.
Figure 2:
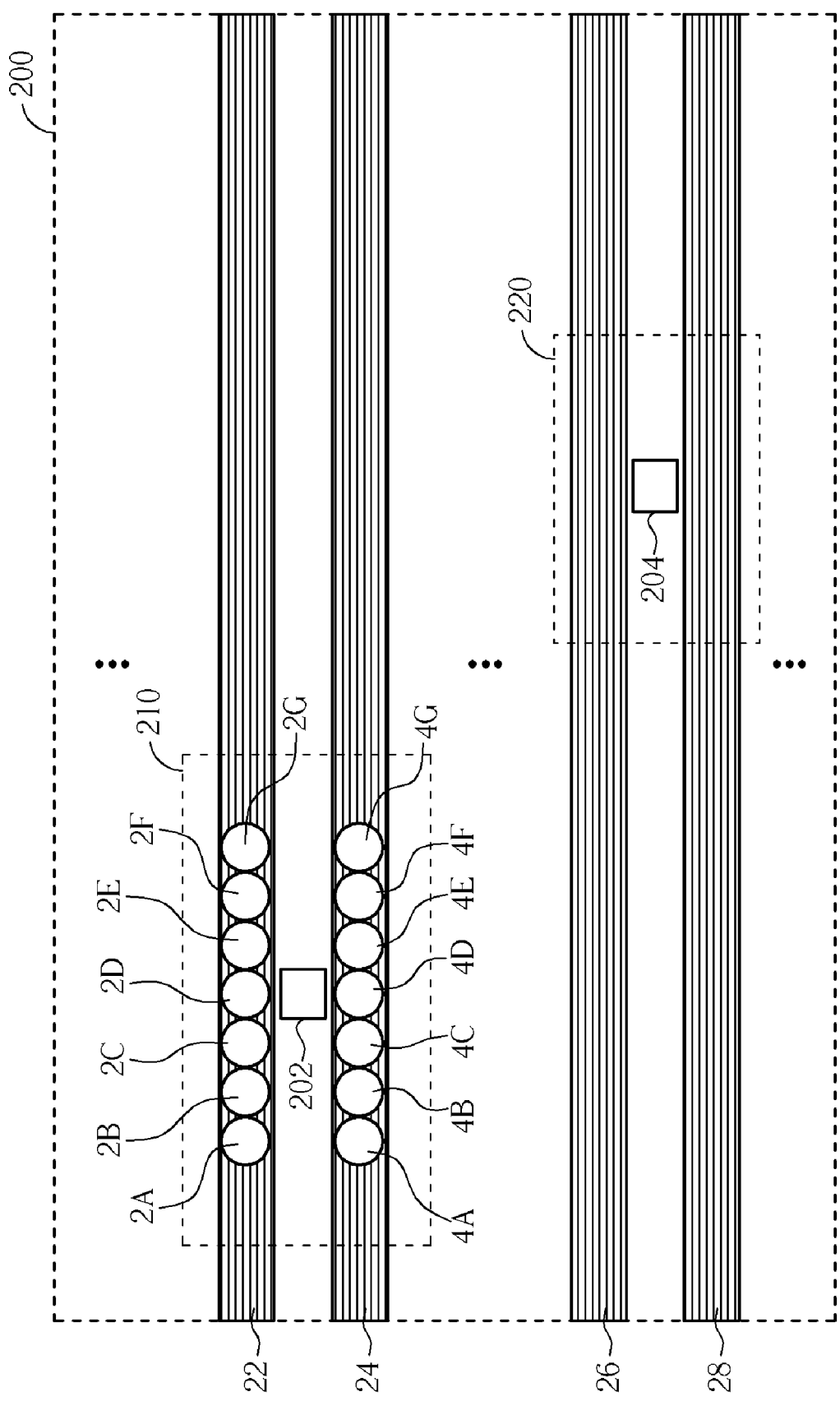
FIG. 2 is a schematic diagram of a target picture.

Please refer to FIG. 1 and FIG. 2. FIG. 1 shows a block diagram of a pixel interpolating device 100 according to an exemplary embodiment of the present invention. The pixel interpolating device 100 is utilized for interpolating pixel values of a plurality of target positions of a target picture. In this embodiment, the pixel interpolating device 100 comprises a control unit 110, a pixel interpolating unit 120, and a detection module 130. FIG. 2 is a schematic diagram of a target picture 200 in which the pixel interpolation operation to be applied. In FIG. 2, pixel rows 22, 24, 26, and 28 denote four existing pixel rows of the target picture 200, and pixel positions 202 and 204 denote two pixel positions need to be interpolated. Hereinafter, the two pixel positions 202 and 204 are referred to as target positions 202 and 204, respectively.

For the purpose of explanatory convenience, the target picture 200 is herein assumed as an image frame with an image field and the pixel rows 22, 24, 26, and 28 are four existing scan line of the target picture 200. As shown in FIG. 2, the pixel row 22 comprises a plurality of pixels including pixels 2A~2G while the pixel row 24 comprises a plurality of pixels including pixels 4A~4G.

In this embodiment, the control unit 110 of the pixel interpolating device 100 is arranged for dynamically setting a plurality of edge detection ranges corresponding to a plurality of target positions of the target picture 200, respectively. For example, the control unit 110 sets a corresponding edge detection range 210 for the target position 202 of the target picture 200 and sets a corresponding edge detection range 220 for the target position 204. Since the control unit 110 dynamically sets an edge detection range for each of the plurality of target positions, the edge detection ranges of the target positions may vary from each other. In addition, for each of the plurality of target positions of the target picture 200, the pixel interpolating unit 120 performs an edge detection according to a corresponding edge detection range to select an edge direction for the target position. Then the pixel interpolating unit 120 interpolates a pixel value for the target position according to pixel data corresponding to the selected edge direction.

Figure 3:
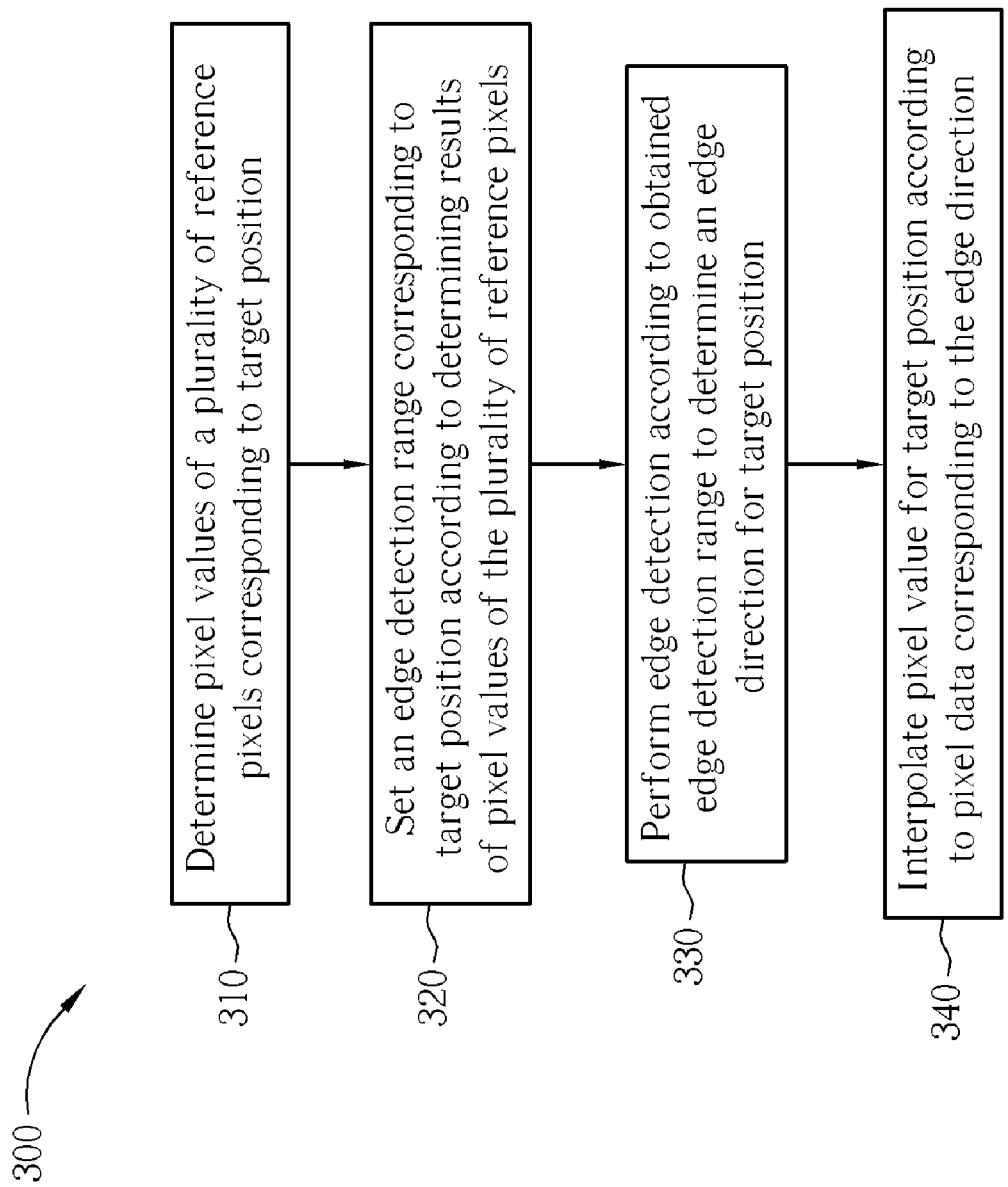
FIG. 3 is a flowchart illustrating a pixel interpolation method according to one embodiment of the present invention.

Please refer to FIG. 3, which shows a flowchart 300 illustrating a pixel interpolation method according to one embodiment of the present invention. Hereinafter, the target position 202 is employed as an example for describing the operations of the pixel interpolating device 100 with reference to the flowchart 300.

In step 310, the detection module 130 of the pixel interpolating device 100 is utilized for determining pixel values of a plurality of reference pixels corresponding to the target position 202. In one embodiment, the detection module 130 determines a pixel value distribution with respect to the plurality of reference pixels to determine the image feature of the target position 202. In practice, the detection module 130 may select some pixels from a first pixel row (i.e., a scan line in this embodiment) prior to the target position 202, from a second pixel row posterior to the target position 202, or from both the first and second pixel rows to be the reference pixels of the target position 202. For example, the detection module 130 may select pixels 2A~2G on the preceding scan line 22 of the target position 202, pixels 4A~4G on the succeeding scan line 24 of the target position 202, or both the pixel 2A~2G and 4A~4G to be the reference pixels of the target position 202. For the purpose of explanatory convenience, the pixels 2A~2G on the scan line 22 are herein assumed to be selected as the reference pixels of the target position 202 by the detection module 130 in this embodiment.

In a preferred embodiment, the detection module 130 comprises a computing unit 132 for generating a plurality of differences by respectively determining pixel difference of each pair of a plurality of pairs of adjacent reference pixels; and a decision unit 134 for determining the pixel value distribution according to the plurality of differences. For example, the computing unit 132 can compute a pixel difference between the reference pixels 2A and 2B, a pixel difference between the reference pixels 2B and 2C, a pixel difference between 2C and 2D, a pixel difference between 2D and 2E, a pixel difference between 2E and 2F, and a pixel difference between 2F and 2G to generate six differences. Then, the decision unit 134 determines the pixel value distribution according to the six differences.

Typically, the six differences have a greater variation if the surrounding image of the target position 202 is more chaotic or disordered. On the contrary, if the surrounding image of the target position 202 is smoother, the six differences have a smaller variation. For example, if the six differences are 100, −80, 97, −52, 71, and −80, it is obvious that the pixel value distribution of the reference pixels 2A~2G is very ragged. This situation often happens on a chaos image region. In practice, the decision unit 134 may determine the pixel value distribution of the plurality of reference pixels according to the variation, the number of sign change, the SAD (sum of absolute difference) of the plurality of differences or the like. Then, the decision unit 134 applies a corresponding signal or value to the control unit 110.

In step 320, the control unit 110 sets a corresponding edge detection range for the target position 202 according to the signal or value, representing the determining result of the pixel values of the plurality of reference pixels obtained by the detection module 130, from the decision unit 134. In this embodiment, the control unit 110 sets a small edge detection range for the target position 202 when the surrounding image of the target position 202 is chaotic, for example, within a radius of three pixels from the target position 202. On the contrary, when the surrounding image of the target position 202 is smooth, the control unit 110 sets a relative large edge detection range for the target position 202, such as within a radius of ten pixels from the target position 202.

Next, in step 330, the pixel interpolating unit 120 performs an edge detection according to the edge detection range of the target position 202 set by the control unit 110 to select an edge direction for the target position 202.

Subsequently, in step 340, the pixel interpolating unit 120 interpolates a pixel value for the target position 202 according to pixel data corresponding to the selected edge direction.

Both the edge detection operation in step 330 and the pixel interpolation operation in step 340 performed by the pixel interpolating unit 120 are well known in the art, and further details are therefore omitted for brevity.

Note that, as previously described, the control unit 110 of the pixel interpolating device 100 is utilized for dynamically setting a plurality of edge detection ranges corresponding to the plurality of target positions, respectively, according to the determining results obtained by the detection module 130. Accordingly, the edge detection range of each target position varies with the image features and characteristics thereof. In other words, the disclosed pixel interpolation method sets a corresponding edge detection range for a target position based on its image features. As a result, the probability of the edge detection operations producing erroneous results can be significantly reduced thereby improving the interpolated image quality. In addition, in the foregoing embodiments, the image feature of a target position is determined based on the determining result of the pixel values of the plurality of reference pixels corresponding to the target position. This is merely an example rather than a restriction of the practical applications. In practice, any other image detection method can also be employed to detect the image feature of each target position.

Additionally, the disclosed pixel interpolation method can not only be applied to interpolate pixels in horizontal pixel rows or horizontal scan lines, but can also be applied to interpolate pixels in vertical pixel rows or vertical scan lines.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel interpolation method for interpolating pixel values of a plurality of target positions of a target picture, the method comprising:
   (a) utilizing a control unit for dynamically setting a plurality of edge detection ranges corresponding to the plurality of target positions, respectively; and
   (b) for each of the plurality of target positions, performing an edge detection according to a corresponding edge detection range to select an edge direction for the target position, and interpolating a pixel value for the target position according to pixel data corresponding to the selected edge direction;
   wherein each of the edge detection ranges is an area having a plurality of pixels included therein, and with respect to a single particular direction, sizes of the plurality of edge detection ranges corresponding to the plurality of target positions are determined according to the pixels surrounding the plurality of target positions, respectively.

2. The method of claim 1, wherein the target picture is an image frame with an image field.

3. The method of claim 1, further comprising:
   (c) for each of the plurality of target positions, determining pixel values of a plurality of reference pixels corresponding to the target position;
   wherein step (a) further comprises:

(a1) for each of the plurality of target positions, setting a corresponding edge detection range for the target position according to the determining result obtained in step (c).

4. The method of claim 3, wherein step (c) further comprises:
(c1) determining a pixel value distribution of the plurality of reference pixels;
wherein the corresponding edge detection range is set according to the pixel value distribution in step (a1).

5. The method of claim 4, wherein step (c1) further comprises:
(c2) generating a plurality of differences by respectively determining pixel difference of each pair of a plurality of pairs of adjacent reference pixels; and
(c3) determining the pixel value distribution according to the plurality of differences.

6. The method of claim 3, wherein the plurality of reference pixels is located at a first scan line or a second scan line, where the first scan line is prior to the target position and the second scan line is posterior to the target position.

7. The method of claim 6, wherein the first scan line is the preceding scan line of the target position.

8. The method of claim 6, wherein the second scan line is the succeeding scan line of the target position.

9. A pixel interpolating device for interpolating pixel values of a plurality of target positions of a target picture, the pixel interpolating device comprising:
a control unit for dynamically setting a plurality of edge detection ranges corresponding to the plurality of target positions, respectively; and
a pixel interpolating unit coupled to the control unit for performing an edge detection according to a corresponding edge detection range to select an edge direction for each of the plurality of target positions, and for interpolating a pixel value for the target position according to pixel data corresponding to the selected edge direction;
wherein each of the edge detection ranges is an area having a plurality of pixels included therein, and with respect to a single particular direction, sizes of the plurality of edge detection ranges corresponding to the plurality of target positions are determined according to the pixels surrounding the plurality of target positions, respectively; and the control unit and the pixel interpolating unit are hardware elements.

10. The pixel interpolating device of claim 9, wherein the target picture is an image frame with an image field.

11. The pixel interpolating device of claim 9, further comprising:
a detection module coupled to the control unit, for each of the plurality of target positions, the detection module determining pixel values of a plurality of reference pixels corresponding to the target position;
wherein for each of the plurality of target positions, the control unit sets a corresponding edge detection range for the target position according to the determining result with respect to the target position obtained by the detection module.

12. The pixel interpolating device of claim 11, wherein the detection module determines a pixel value distribution of the plurality of reference pixels, and the control unit sets the corresponding edge detection range of the target position according to the pixel value distribution.

13. The pixel interpolating device of claim 12, wherein the detection module comprises:

a computing unit for generating a plurality of differences by respectively determining pixel difference of each pair of a plurality of pairs of adjacent reference pixels; and
a decision unit coupled to the computing unit for determining the pixel value distribution according to the plurality of differences.

14. The pixel interpolating device of claim 11, wherein the plurality of reference pixels is located at a first scan line or a second scan line, where the first scan line is prior to the target position and the second scan line is posterior to the target position.

15. The pixel interpolating device of claim 14, wherein the first scan line is the preceding scan line of the target position.

16. The pixel interpolating device of claim 14, wherein the second scan line is the succeeding scan line of the target position.

17. A pixel interpolation method for interpolating a pixel value of a target position of a target picture, the method comprising:
(a) determining pixel values of a plurality of reference pixels corresponding to the target position;
(b) utilizing a control unit for setting an edge detection range corresponding to the target position according to the determining result of the pixel values of the plurality of reference pixels, wherein the edge detection range is an area having a plurality of pixels included therein, and with respect to a single particular direction, a size of the edge detection range is determined according to the pixel values of the plurality of reference pixels;
(c) performing an edge detection according to the edge detection range to select an edge direction for the target position; and
(d) interpolating a pixel value for the target position according to pixel data corresponding to the selected edge direction.

18. The method of claim 17, wherein the step (a) further comprises:
determining a pixel value distribution according to the pixel values of the plurality of reference pixels;
wherein the step (b) sets the edge detection range of the target position in response to the pixel value distribution.

19. A pixel interpolating device for interpolating a pixel value of a target position of a target picture, the pixel interpolating device comprising:
a detection module for determining pixel values of a plurality of reference pixels corresponding to the target position;
a control unit coupled to the detection module for setting an edge detection range corresponding to the target positions according to the determining result of the pixel values of the plurality of reference pixels, wherein the edge detection range is an area having a plurality of pixels included therein, and with respect to a single particular direction, a size of the edge detection range is determined according to the pixel values of the plurality of reference pixels; and
a pixel interpolating unit coupled to the control unit for performing an edge detection according to the edge detection range to select an edge direction for the target position and for interpolating a pixel value for the target position according to pixel data corresponding to the selected edge direction;
wherein the detection module, the control unit, and the pixel interpolating unit are hardware elements.

20. The pixel interpolating device of claim 19, wherein the detection module determines a pixel value distribution of the plurality of reference pixels, and the control unit sets the edge detection range of the target position according to the pixel value distribution.

21. The method of claim 4, wherein step (a1) further comprises:
setting the corresponding edge detection range for a first size when the pixel value distribution of the plurality of reference pixels has a first variation; and
setting the corresponding edge detection range for a second size larger than the first size when the pixel value distribution has a second variation smaller than the first variation.

22. The pixel interpolating device of claim 12, wherein when the pixel value distribution of the plurality of reference pixels has a first variation, the control unit sets the corresponding edge detection range for a first size; and when the pixel value distribution has a second variation smaller than the first variation, the control unit sets the corresponding edge detection range for a second size larger than the first size.

23. The method of claim 18, wherein step (b) comprises:
setting the corresponding edge detection range for a first size when the pixel value distribution of the plurality of reference pixels has a first variation; and
setting the corresponding edge detection range for a second size larger than the first size when the pixel value distribution has a second variation smaller than the first variation.

24. The pixel interpolating device of claim 20, wherein when the pixel value distribution of the plurality of reference pixels has a first variation, the control unit sets the corresponding edge detection range for a first size; and when the pixel value distribution has a second variation smaller than the first variation, the control unit sets the corresponding edge detection range for a second size larger than the first size.

* * * * *